United States Patent
Parente Da Silva

(10) Patent No.: US 9,195,231 B2
(45) Date of Patent: Nov. 24, 2015

(54) SYSTEM AND METHOD OF OPERATION FOR REMOTELY OPERATED VEHICLES WITH SUPERIMPOSED 3D IMAGERY

(71) Applicant: Abyssal S.A., Matosinhos (PT)

(72) Inventor: Manuel Alberto Parente Da Silva, Maia (PT)

(73) Assignee: Abyssal S.A., Matosinhos (PT)

( * ) Notice: Subject to any disclaimer, the term of this patent is extended or adjusted under 35 U.S.C. 154(b) by 0 days.

(21) Appl. No.: 14/357,100

(22) PCT Filed: Nov. 8, 2012

(86) PCT No.: PCT/IB2012/002281
§ 371 (c)(1),
(2) Date: May 8, 2014

(87) PCT Pub. No.: WO2013/068821
PCT Pub. Date: May 16, 2013

(65) Prior Publication Data
US 2014/0316611 A1   Oct. 23, 2014

Related U.S. Application Data

(60) Provisional application No. 61/681,411, filed on Aug. 9, 2012.

(30) Foreign Application Priority Data

Nov. 9, 2011  (PT) .......................................... 105989

(51) Int. Cl.
G06T 19/00     (2011.01)
G05D 1/00      (2006.01)
G06T 15/50     (2011.01)

(52) U.S. Cl.
CPC ............. G05D 1/0038 (2013.01); G05D 1/0044 (2013.01); G06T 15/503 (2013.01); G06T 19/006 (2013.01); G06T 2210/62 (2013.01)

(58) Field of Classification Search
CPC .......... G60T 19/00; G60T 15/50; G05D 1/00; G05D 1/08; G05D 3/12; G01S 15/74; G09B 19/00; B25J 19/04

USPC ............... 701/2, 23, 25, 28, 21; 345/427, 633
See application file for complete search history.

(56) References Cited

U.S. PATENT DOCUMENTS

| | | | | |
|---|---|---|---|---|
| 5,412,569 | A | 5/1995 | Corby, Jr. et al. | 364/424.01 |
| 5,706,195 | A * | 1/1998 | Corby et al. | 701/2 |

(Continued)

FOREIGN PATENT DOCUMENTS

| | | | | |
|---|---|---|---|---|
| FR | 2949167 | 2/2011 | | G60T 13/00 |
| GB | 2464985 | 5/2010 | | G05D 1/08 |

(Continued)

OTHER PUBLICATIONS

International Preliminary Report on Patentability; PCT/IB2012/002281; pp. 6, May 22, 2014.

(Continued)

*Primary Examiner* — Tan Q Nguyen
(74) *Attorney, Agent, or Firm* — Baker Botts L.L.P.

(57) ABSTRACT

The present invention provides a system and method of utilizing superimposed 3D imagery for remotely operated vehicles, namely 3D, reconstructed images of the environment of the ROV. In another aspect, it includes generating a virtual video of 3D elements in the operation environment, synchronizing the angle and position of the camera of a virtual video with the angle and position of a real camera, superimposing the virtual video and the real video from the real camera; superimposing these video feeds such that one is manipulated to show transparencies in areas of less interest, in order to show through the other video. It furthermore may include superimposing information, whether graphic, textual or both on to the hybrid virtual-real 3D imagery. The subject invention is also networked, such that the immersive visual interface described above is accessible to a plurality of users operating from a plurality of locations.

20 Claims, 13 Drawing Sheets

(56) References Cited

U.S. PATENT DOCUMENTS

| | | | |
|---|---|---|---|
| 2001/0037163 A1 | 11/2001 | Allard | 700/245 |
| 2004/0179104 A1* | 9/2004 | Benton | 348/207.99 |
| 2005/0285875 A1* | 12/2005 | Kang et al. | 345/629 |
| 2008/0027591 A1* | 1/2008 | Lenser et al. | 701/2 |
| 2009/0276105 A1 | 11/2009 | Lacaze et al. | 701/2 |
| 2011/0264303 A1 | 10/2011 | Lenser et al. | 701/2 |
| 2013/0197801 A1* | 8/2013 | Geelen et al. | 701/461 |

FOREIGN PATENT DOCUMENTS

| | | | |
|---|---|---|---|
| JP | H11139390 | 5/1999 | B63C 11/48 |
| WO | 2006/011153 | 2/2006 | G60T 13/00 |

OTHER PUBLICATIONS

Search Report issued in Portugal Patent Appl. No. PT105989, 11 pages, Apr. 26, 2013.

Written Opinion issued in Singapore Patent Appl. No. 11201402114P, 24 pages, May 12, 2015.

Sugimoto et al., "Time Follower's Vision: A Teleoperation Interface with Past Images", Emerging Technologies, IEEE Computer Society, p. 54-63, Jan. 2005.

Toal et al., "Precision Navigation Sensors Facilitate Full Auto Pilot Control of Smart ROV for Ocean Energy Applications", IEEE, 4 pages, 2011.

* cited by examiner

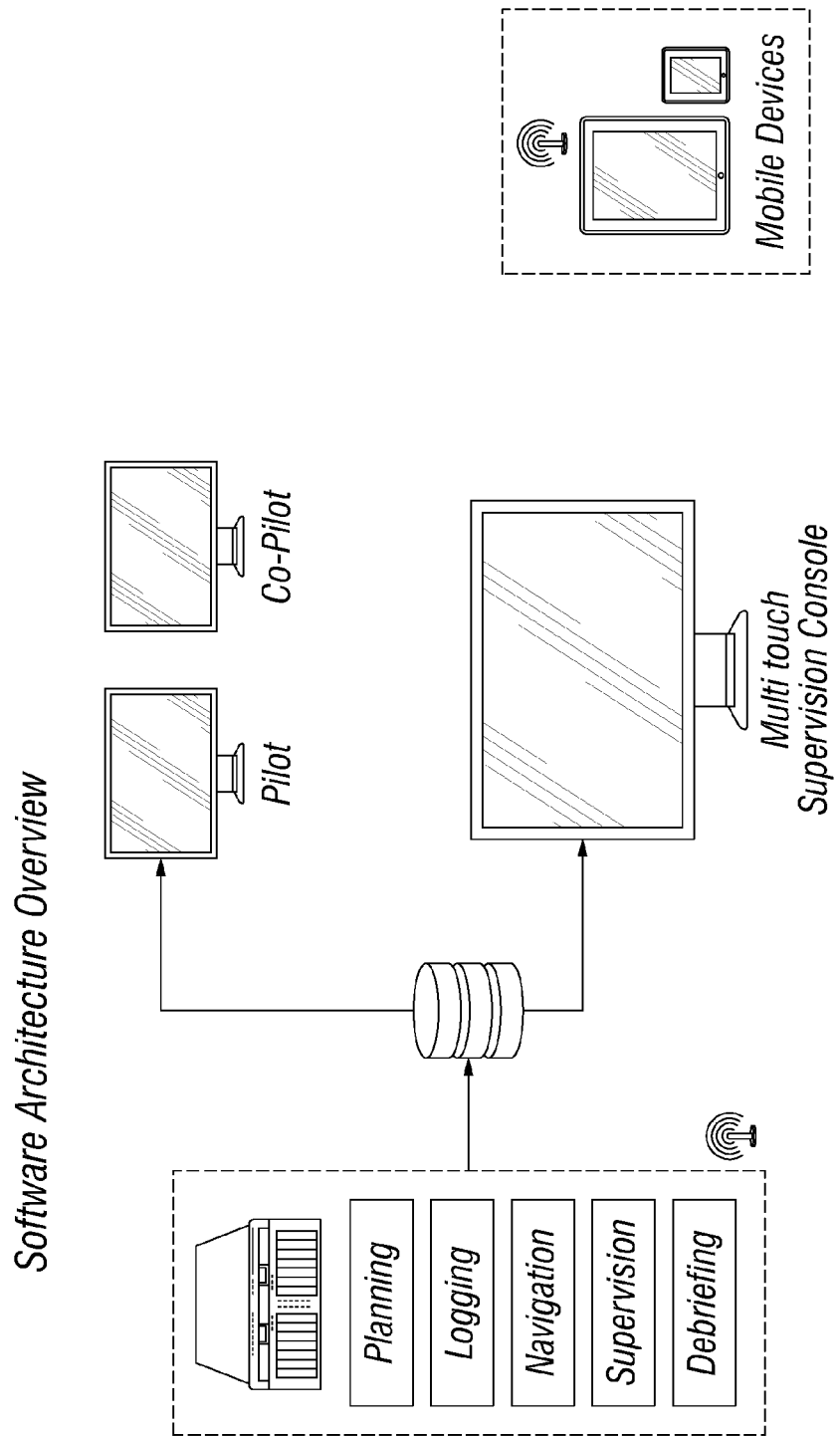

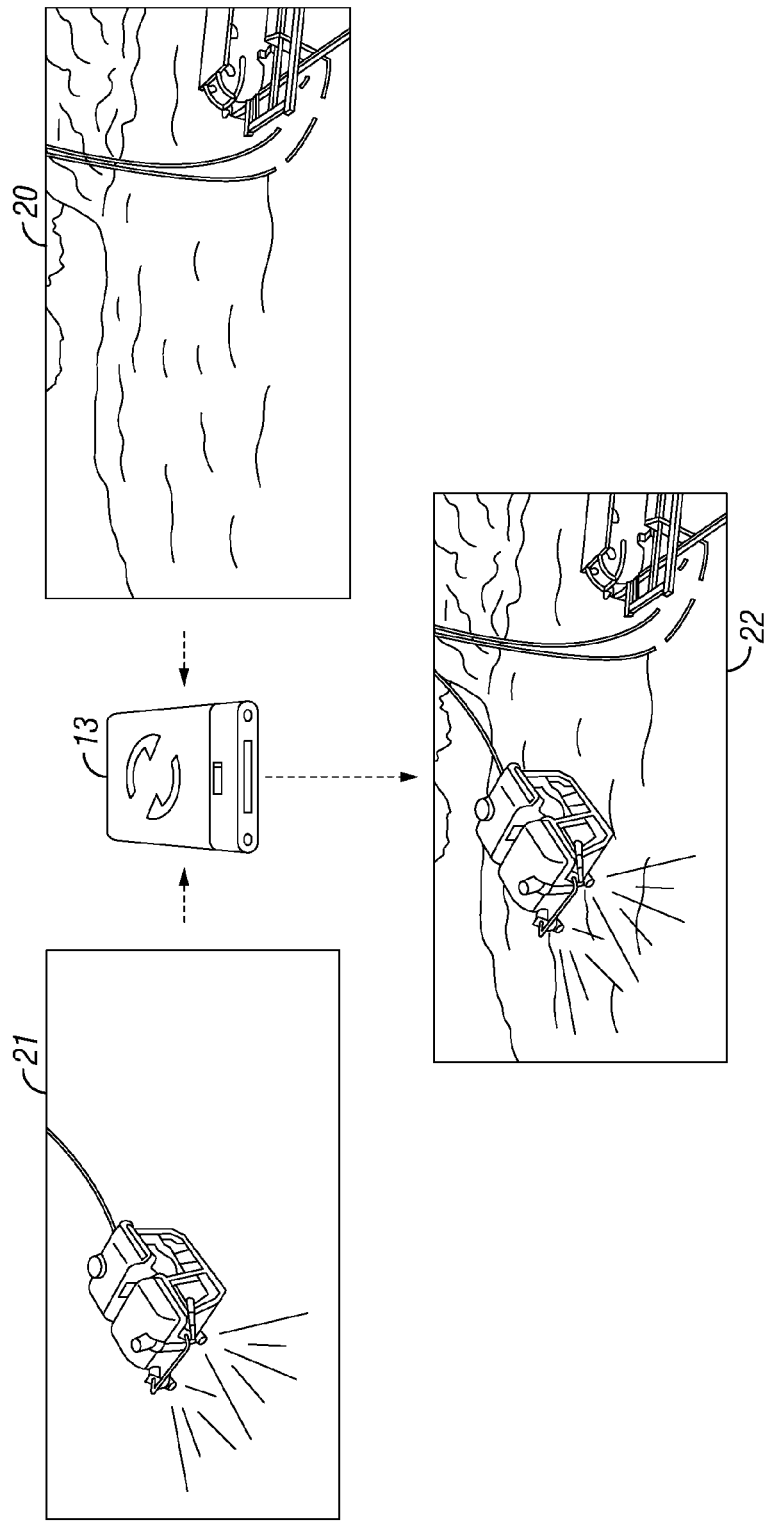

SYSTEM AND METHOD OF OPERATION FOR REMOTELY OPERATED VEHICLES WITH SUPERIMPOSED 3D IMAGERY

CROSS-REFERENCE TO RELATED APPLICATIONS

This application is a U.S. National Stage Application of International Application No. PCT/IB2012/002281 filed Nov. 8, 2012, which designates the United States and claims the benefit of U.S. Provisional Patent Application Ser. No. 61/681,411 filed on Aug. 9, 2012, and claims the benefit of Portugal Patent Application PPP 105989 filed Nov. 9,2011, the entire disclosures of which are herby incorporated by reference.

The disclosures of published patent documents referenced in this application are hereby incorporated in their entireties by reference into this application in order to more fully describe the state of the art to which this invention pertains.

The present invention relates to a three-dimensional ("3D") navigation and control system for remotely operated vehicles ("ROV"), and methods for its use. In particular, the present invention provides for a navigation and control system that is standardized in order to be compatible with a wide range of ROV options.

BACKGROUND OF THE INVENTION

Exploration of last frontier on earth, the sea, is largely driven by the continuing demand for energy resources. Because humans are not able to endure the pressures induced at the depths at which energy reconnaissance occurs, we have become increasingly reliant upon ROV technology. The future of the exploration of the oceans is only as fast, reliable and safe as the available technology.

Prior art related to augmented reality navigation, such as U.S. Pre-grant Publication 2011/0153189, disclose systems for superimposing 3D objects and a video feed, but do not provide crucial devices for dealing with the vicissitudes of undersea navigation. Meanwhile, powerful graphics systems used for undersea navigation, such as those described in U.S. Pre-grant Publication 2009/0040070 A1 and U.S. Pat. No. 8,015,507 fail to provide a navigation interface that creates an immersive visual experience for the pilot or user.

An important shortcoming of the available ROV navigation technology is its inability to provide complete spatial awareness, i.e., the ability to consistently know the past and current flight path. Current navigation systems rely on conventional telemetry information, including depth, pitch, roll, camera tilt and heading. However, positioning systems, which provide the geographic location of the ROV, have not been seamlessly integrated with the depth and orientation instruments that constitute conventional telemetry systems.

Another important aspect of undersea exploration is the acquisition and application of information relating to the seabed and subsea structures. Modern multibeam sonar devices with modeling software provide detailed, 3D bathymetric data, which is essential to planning and evaluating exploratory missions. This bathymetric data is used extensively by supervisors and client representatives in the energy resources industry. However, conventional systems do not integrate the use of bathymetric modeling with real-time navigation in a way that facilitates the work of the ROV pilots themselves.

Much like jet fighter pilots, ROV pilots must navigate in three dimensions, in real time, and in conditions where visibility may be limited to between 2 and 10 meters. Accordingly, both types of pilots must have fast, reliable and intelligent data presented to them under low visibility conditions. However, the dynamic user interfaces used for complex aviation missions, which overlay quantitative environmental information, textual plans and other important graphics, have not been made available for comparably complex undersea missions.

A key to establishing a successful operating system for ROV missions is providing for effective collaboration and communication between every person involved in the project. The ability to introduce new data and share that data among the system users, and particularly with the pilot, advantageously leads to increased efficiency and safety.

Accordingly, there is a need for an augmented approach to pilot-ROV interactions in which information can be visualized and logged in the three spatial dimensions and in real time.

SUMMARY OF THE INVENTION

This disclosure provides tools and features that implement systems and methods relating to the operation of ROV with superimposed 3D imagery and navigational information. Although embodiments and examples are provided in the context of undersea missions, one skilled in the art should appreciate that the aspects, features, functionalities, etc., discussed in this disclosure can also be extended to virtually any type of complex navigation project.

In an aspect of this disclosure, an operation and navigation system is provided to allow seamless integration between a wide variety of ROV control systems. That is, the invention enables engineers and supervisors to plan one or several missions on one common, standard system that may be used for the operation and navigation of a wide range of ROV's by pilots and operators.

In another aspect, the invention provides a navigational system that visually presents any relevant geographical information relating to the planned flight path, waypoints, checkpoints, work sites and procedures provided by an operating system. It provides for collection and transfer of data, such that a user may log procedures during operation, update the system when the tasks are completed, and produce video- and/or text-based reports of the mission with the collected data. The system thus provides fully updated status information regarding the progress of the mission and the position of the ROV.

In a preferred embodiment, the invention includes computing hardware, one or more display screens, sonar technology, and software for a graphic user interface, all of which may interact with one or more ROV. The present invention also provides databases and software for execution by the computing hardware, including numerous modules for: obtaining, saving and modeling 3D elements in the operation environment of the ROV; synchronizing a virtual camera for viewing the modeled image with the real camera of an ROV; providing hybrid 3D imagery by superimposing real camera images and modeled images such that areas of heightened interest are rendered more visible or opaque than areas of lesser interest; and superimposing graphical or textual information on the hybrid 3D imagery. Additional software modules, which cooperate with the user interface, are provided for planning, supervising, logging, sharing and reporting all aspects of ROV-mediated exploration.

By implementing the various tools and features outlined above and discussed in detail below, the present system can greatly improve the way subsea operations are conducted. For example, the invention will provide ROV operators with immersive operating systems for mission planning, supervision and reporting. Improved visualization of the subsea environment and improved communication with supervisors and other pilots will lead to better overall efficiency, and less stress during long piloting shifts. The efficiencies of data transfer and task completion created by the subject operating system will lead to still further benefits, such as operational cost reduction and consequent revenue increase. Additionally, more efficient use of ROVs due to improved mission logistics will lead to an increase in the utilization period of those ROVs. The benefits to entities initiating and funding undersea research include improved access to detailed reports, and even to data acquired in real-time, without having to visit the research site. These are just some of the benefits that the system brings.

BRIEF DESCRIPTION OF THE DRAWINGS

The aforementioned and other aspects, features and advantages can be better understood from the following detailed description with reference to the accompanying drawings wherein:

FIGS. 3A and 3B show software architecture overviews of a system, in an exemplary embodiment;

FIG. 5B illustrates hybrid 3D imagery obtained by superimposing a virtual video and a real video, according to another exemplary embodiment.

DETAILED DESCRIPTION OF THE INVENTION

Figure 1A:
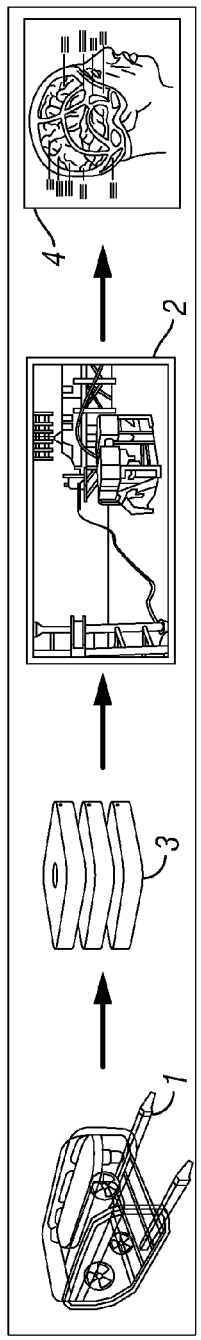
FIG. 1A shows a diagrammatic view of a system, according to an exemplary embodiment.

The invention provides system for operating a remotely operated vehicle comprising:
a) a database module of 3D elements representing objects disposed in an operation environment of said vehicle, said 3D elements comprising data acquired by multibeam sonar;
b) a virtual video generating module for generating a virtual video of incorporating said 3D elements;
c) a video camera mounted to the vehicle for generating a real video of the operation environment of said vehicle;
d) a synchronizing module for synchronizing an angle and position of a virtual camera with an angle and position of the video camera mounted to the vehicle, wherein the virtual camera defines a field of view for the virtual video; and
e) a superimposition module for superimposing said virtual video and said real video, wherein said superimposition module is configured to modulate the transparency or opaqueness of a region of lesser interest in one of the virtual or real videos such that a corresponding region of the other video is more visible, said superimposed virtual and real videos comprising hybrid 3D imagery.

In one embodiment of the subject invention, the superimposition module is configured to superimpose graphic information, textual information, or both, onto the hybrid 3D imagery. The superimposing may be based on a luminance threshold, wherein luminance in the Red-Green-Blue hexadecimal format may be set to values between 0-0-0 and 255-255-255, and preferably between 0-0-0 and 40-40-40.

The invention also provides a system for undersea exploration comprising:
a) a remote operated vehicle (ROV), wherein said ROV comprises a camera for acquiring a real video;
b) a networked operating system comprising a computer and computer executable software, said networked operating system comprising a visualization engine, wherein said visualization engine further comprises
   i. a database module of 3D elements representing objects disposed in an operation environment of said vehicle;
   ii. a virtual video generating module for generating a virtual video of incorporating said 3D elements;
   iii. a synchronizing module for synchronizing an angle and position of a virtual camera with an angle and position of the video camera mounted to the vehicle, wherein the virtual camera defines a field of view for the virtual video, said field of view extending from about 45 to 144 degrees from a central point of view; and
   iv. a superimposition module for superimposing said virtual video and said real video, wherein said superimposition module is configured to modulate the transparency or opaqueness of a region of lesser interest in one of the virtual or real videos such that a corresponding region of the other video is more visible, said superimposed virtual and real videos comprising hybrid 3D imagery; and
c) a navigation interface configured to display said hybrid 3D imagery, said navigating interface comprising at least one networked monitor.

In another embodiment of the invention, the operating system is capable of sharing data with a plurality of remote monitors, wherein said plurality of monitors may include up to 12, and preferably between 3 and 9 monitors.

In yet another embodiment of the invention, the system further comprises an external system configured to determine whether the system is working or is in a fail state. The external system may be configured to switch the monitor input from hybrid 3D imagery to a live video feed if the system is in a fail state.

In yet another embodiment of the invention, the navigation interface comprises at least three networked monitors, wherein said monitors are arranged adjacent to one another such that the middle monitor displays video and augmented reality, while both side monitors display an expanded view of a field of operation.

In yet another embodiment of the invention, the navigation interface comprises one or more touch screens, one or more speakers for providing audio warnings and sounds, one or more microphones for receiving voice commands, one or more joysticks, one or more gamepads, and/or one or more computer mice.

In yet another embodiment of the invention, the functions of the operating system are abstracted such that the operating system is compatible with a plurality of hardware options.

The invention also provides a method of operating a remotely operated vehicle comprising:
a) obtaining 3D bathymetry data using multibeam sonar;
b) storing 3D elements in a database module, said 3D elements representing objects disposed in the remotely operated vehicle's operation environment and comprising said 3D elements comprising said 3D bathymetry data;
c) generating a virtual video of said 3D elements;
d) synchronizing an angle and position of a virtual camera with an angle and position of the video camera mounted to the vehicle, wherein the virtual camera defines a field of view for the virtual video; and
e) superimposing said virtual video and said real video, wherein superimposing further comprises the step of modulating the transparency or opaqueness of a region of lesser interest in one of the virtual or real video feeds such that a corresponding region of the other video is more visible, said superimposed virtual and real video feeds comprising hybrid 3D imagery.

In a further embodiment, a method according to the invention further comprises the step of superimposing graphic information, textual information, or both, onto the hybrid 3D imagery.

In a still further embodiment of the invention, the step of modulating the transparency or opaqueness further comprises establishing a luminance threshold. In an exemplary embodiment, establishing the luminance threshold comprises maintaining a background of the virtual video at a higher transparency than the background of the real video.

In yet another embodiment of the invention, synchronizing the angle and position of the cameras comprises the steps of:
a) calculating an angle between a heading of the vehicle and a direction of a real camera field of view;
b) calculating an angle between a vertical orientation of the vehicle and the direction of the real camera field of view; and
c) calculating an angle between the vehicle and a geographic horizon.

In a further embodiment, a method according to the invention also comprises the step of displaying said hybrid 3D imagery on a navigation interface. In an exemplary embodiment, the step of displaying further comprises modulating the amount of 2D or 3D information superimposed onto the video screen based the position of the ROV relative to undersea structures. In another exemplary embodiment, the step of displaying further comprises providing a minimap, said minimap defining a computer-generated graphic showing either or both cardinal points or a position of an object in 3D.

In yet another embodiment, a method according to the invention comprises analyzing the displayed information to determine the status of procedures.

In yet another embodiment, a method according to the invention comprises updating the displayed information as tasks are completed.

In yet another embodiment, a method according to the invention comprises determining the positioning of said 3D elements using a global positioning system.

In yet another embodiment, a method according to the invention comprises the step of planning an undersea exploration mission, wherein said planning comprises entering user-determined information for display on a navigation interface, said user-determined information comprising any one or combination of bathymetry information, ROV waypoint information, ROV checkpoint information, procedure information, timed procedure information, flight path information, 3D modeled elements, GPS-determined position information and pilot information. In an exemplary embodiment, the method also comprises the step of configuring the operating system such that entering, leaving, or remaining longer than a designated time at a GPS-determined position triggers any one or combination of an alarm, notification, procedure change or task change.

In yet another embodiment, a method according to the invention comprises the step of logging an undersea exploration mission, wherein said logging comprises recording any one or combination of telemetry data, sonar data, 3D models, bathymetry data, flight path information, ROV waypoint information, ROV checkpoint information, procedure information, positioning information and inertial data. In an exemplary embodiment, the method also comprises reporting information that has been logged. In an exemplary embodiment, the method also comprises saving information that has been logged to a networked database. In an exemplary embodiment, the method also comprises producing a report based on the saved information, wherein said report provides a 3D recreation of the operation.

The invention also provides a computer program product, stored on a computer-readable medium, for implementing any method according to invention as described herein.

As mentioned supra, various features and functionalities are discussed herein by way of examples and embodiments in a context of ROV navigation for use in undersea exploration. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Definitions

The following terms are defined as follows:

3D elements; 3D objects—Data defining three-dimensional shapes, obtained by modeling sonar-derived input or user-determined input.

Abstraction; layer of abstraction—A characteristic of executable software, wherein differing data formats are standardized into a common format such that components are made compatible.

Data engine—A collection of modules, according to an embodiment of this invention, which is responsible for at least the acquisition, storing and reporting of data collected over the course of a ROV mission.

Fail state—A state, defined by a user or by a standard, wherein the functionality of the system, according to an embodiment of the invention, has decreased to an unacceptable level.

Luminance threshold—A system-determined value of RGB (Red, Green, Blue) pixel color intensity which defines a visible but transparent state for the images depicted by a digital image output device.

Module—A combination of at least one computer processor, computer memory and custom software that performs one or more defined functions.

Navigation engine—A collection of modules, according to an embodiment of this invention, which is responsible for making the Navigation Interface interactive, and for producing data for displaying on the Navigation Interface.

Positioned; geopositioned; tagged—Having a location defined by the Global Positioning System of satellites and/or acoustic or inertial positioning systems, and optionally having a location defined by a depth below sea level.

ROV—A remotely operated vehicle; often an aquatic vehicle.

Visualization engine—A collection of modules, according to an embodiment of this invention, which is responsible for producing the displayed aspect of the navigation Interface.

System Hardware and Devices

Referring now to the drawings, wherein like reference numerals designate identical or corresponding parts throughout the several views, FIG. 1A diagrammatically depicts a system according to an embodiment of the invention. This system includes an ROV and its associated instrumentation 1, an operating system housed within computer hardware 3 and a user interface and its associated devices 2. The operating system 3 mediates interaction between the ROV 1 and the user 4, such that the user may submit commands and inquiries for information to the ROV 1, and obtain mechanical responses and data output from the ROV 1.

Figure 1B:
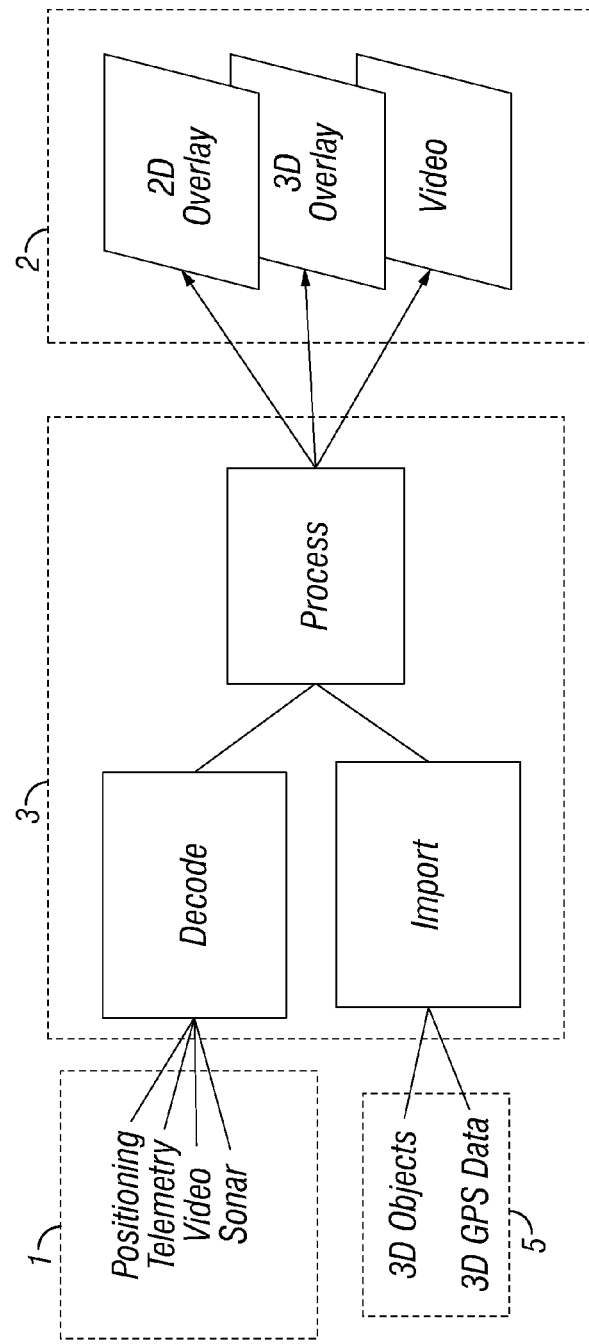
FIG. 1B shows a diagrammatic view of a system and its associated functions, according to another exemplary embodiment.

As seen from FIG. 1B, the operating system 3 may receive live information obtained by the ROV's 1 multibeam 3D real-time sonar, telemetry data, positioning data and video as well as programmed 3D objects from a database 5, and process that data to provide live 3D models of the environment for both augmented reality and full 3D rendering displayed at the user interface 2. The user interface 2 may also be used to display video obtained using the ROV's 1 digital instrumentation, including, for example, cameras and other sensors. The ROV 1 utilized in the system of the present invention is equipped with conventional instrumentation for telemetry and positioning, which are responsive to the commands mediated by the operating system 3.

In one embodiment of the invention, the hardware for the operating system 3 includes a high-end rack computer that can be easily integrated with any ROV control system. The several software modules that further define the operating system will be described in further detail infra.

Figure 2A:
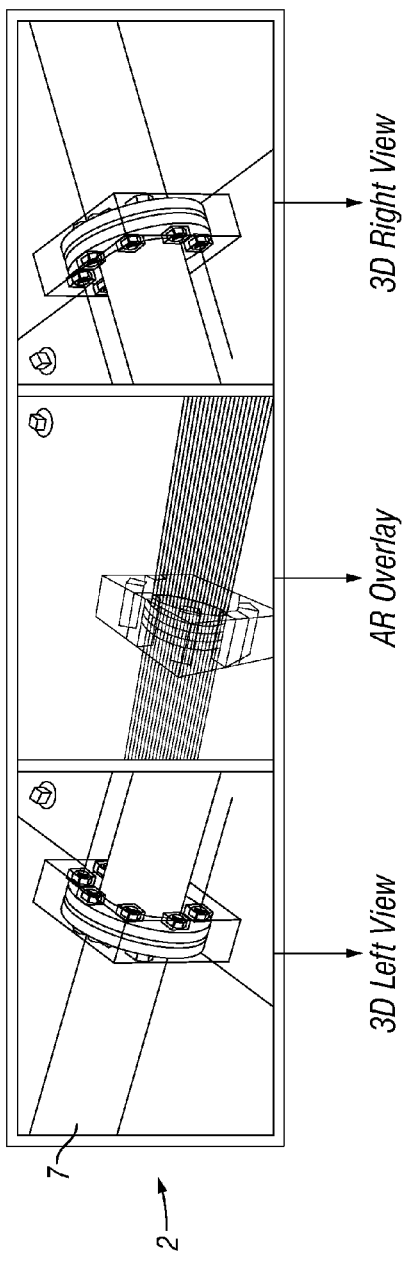
FIGS. 2A and 2B depict alternative views of a user interface of a system according to another embodiment of the invention.
Figure 2B:
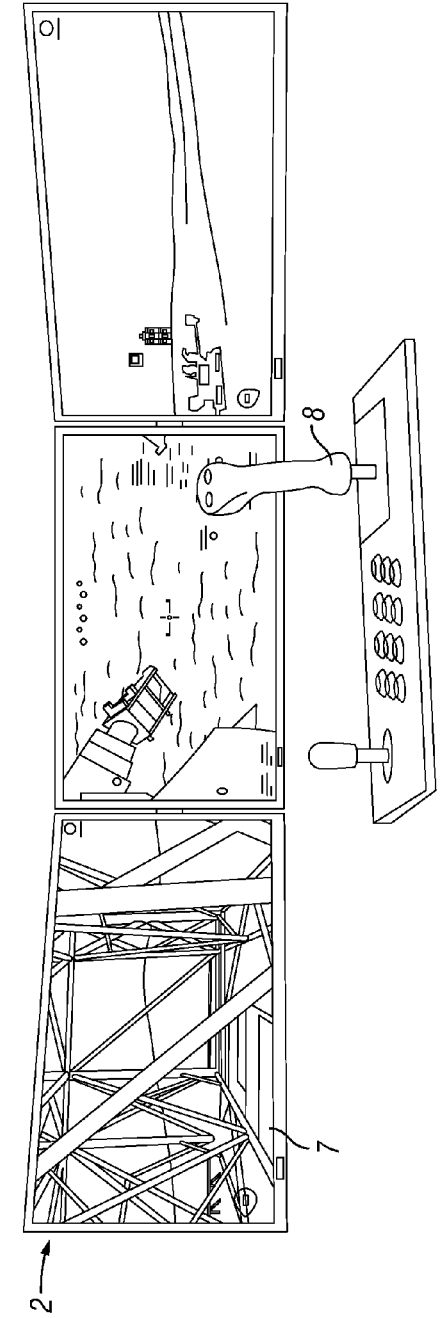

With reference to FIGS. 2A and 2B, the human-machine interface includes at least one monitor 7, and preferably three interactive monitors 7 for navigation. According to one embodiment shown in FIG. 2A, the center monitor 7 provides a video feed and augmented reality (AR), while the side monitors provide an expansion of the field of view of operation. In another aspect, the side monitors may allow the user to have a panoramic view of the ROV environment using full 3D visualization from the point of view of the ROV. As seen in FIG. 2B, the interaction between the user and the system may utilize joysticks 8 or gamepads. In another embodiment, the user interface 2 may employ touch or multi-touch screen technology, audio warnings and sounds, voice commands, a computer mouse, etc.

Functional Modules

Rather than developing a different operating system 3 for each brand and model of ROV 1, the present invention works by abstraction, such that the disclosed operating system 3 and associated hardware work the same way with all ROVs 1. For example, if one component delivers "$DBS, 14.0, 10.3" as a depth and heading coordinates, and another component delivers "$HD, 15.3, 16.4" as heading and depth coordinates, these data strings are parsed into their respective variables: Depth1=14.0, Depth2=16.4, Heading1=16.4, Heading2=15.3. This parsing allows both system to work the same way, regardless of the data format details.

By developing a layer of abstraction of drivers for communication between the operating system 3 and the ROV hardware, the user 4 is provided with seamless data communication, and is not restricted to using particular ROV models. This abstraction further allows users 4 and systems 3 to communicate and network information between several systems, and share information among several undersea projects. The use of a single system also allows for cost reduction in training, maintenance and operation of this system.

Figure 3A:
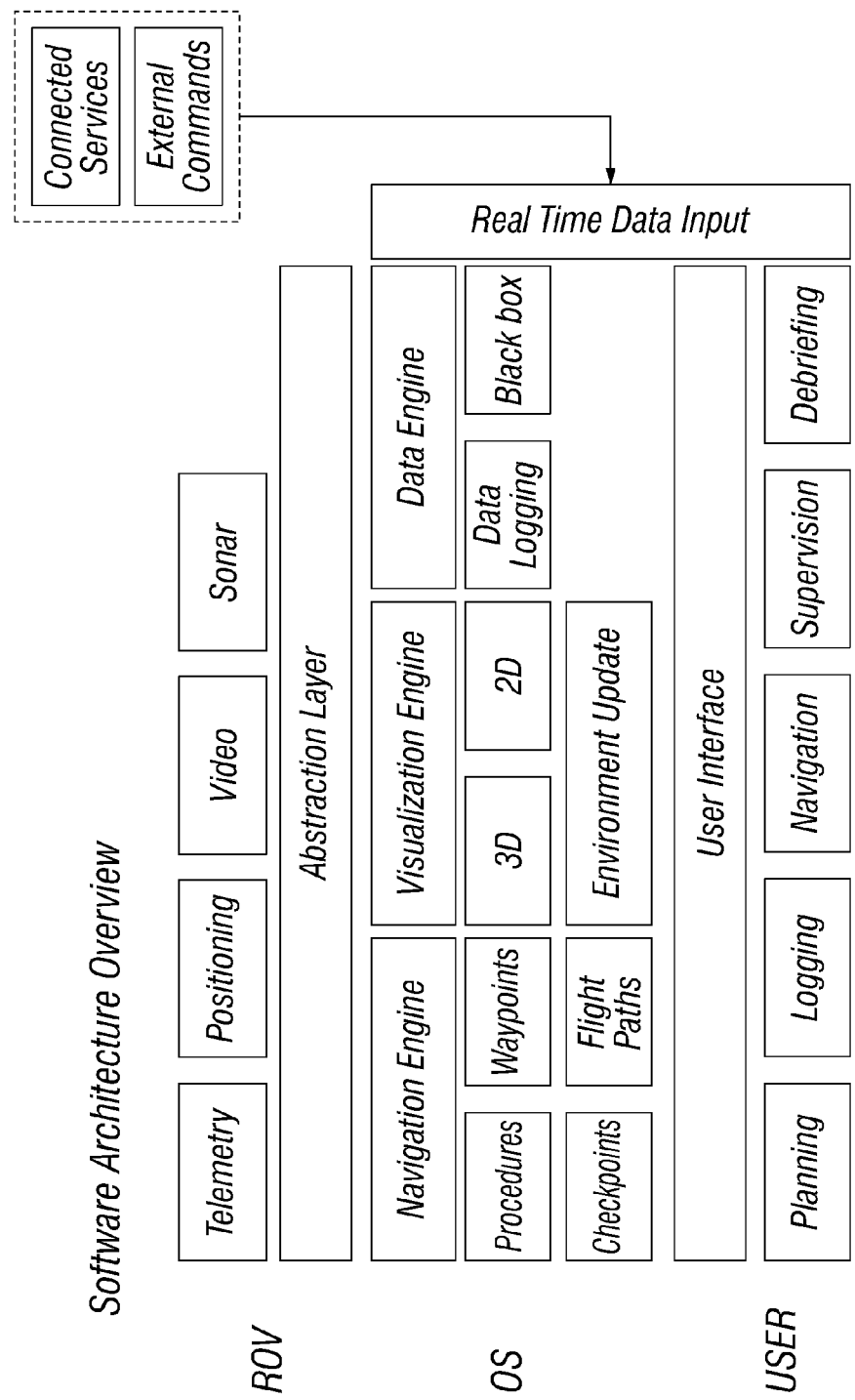

FIG. 3A depicts a software architecture overview illustrating the component parts of the ROV 1, user interface 2 and operating system 3. Software counterparts are provided for the ROV's telemetry, positioning, video and sonar instrumentation. In order to implement user functions including planning, logging, navigation, supervision and debriefing, the operating system 3 provides a navigation engine, a visualization engine and a data engine. The operating system 3 is networked such that connected services and external command units can provide real-time data input. One of such external command units may be configured as a watchdog. The external watchdog system may perform periodic checks to determine whether the system is working properly, or is in a fail state. If the system is in a fail state, the watchdog may change the monitors' inputs, or bypass them, to a conventional live video feed until the system is operating correctly.

Figure 3C:
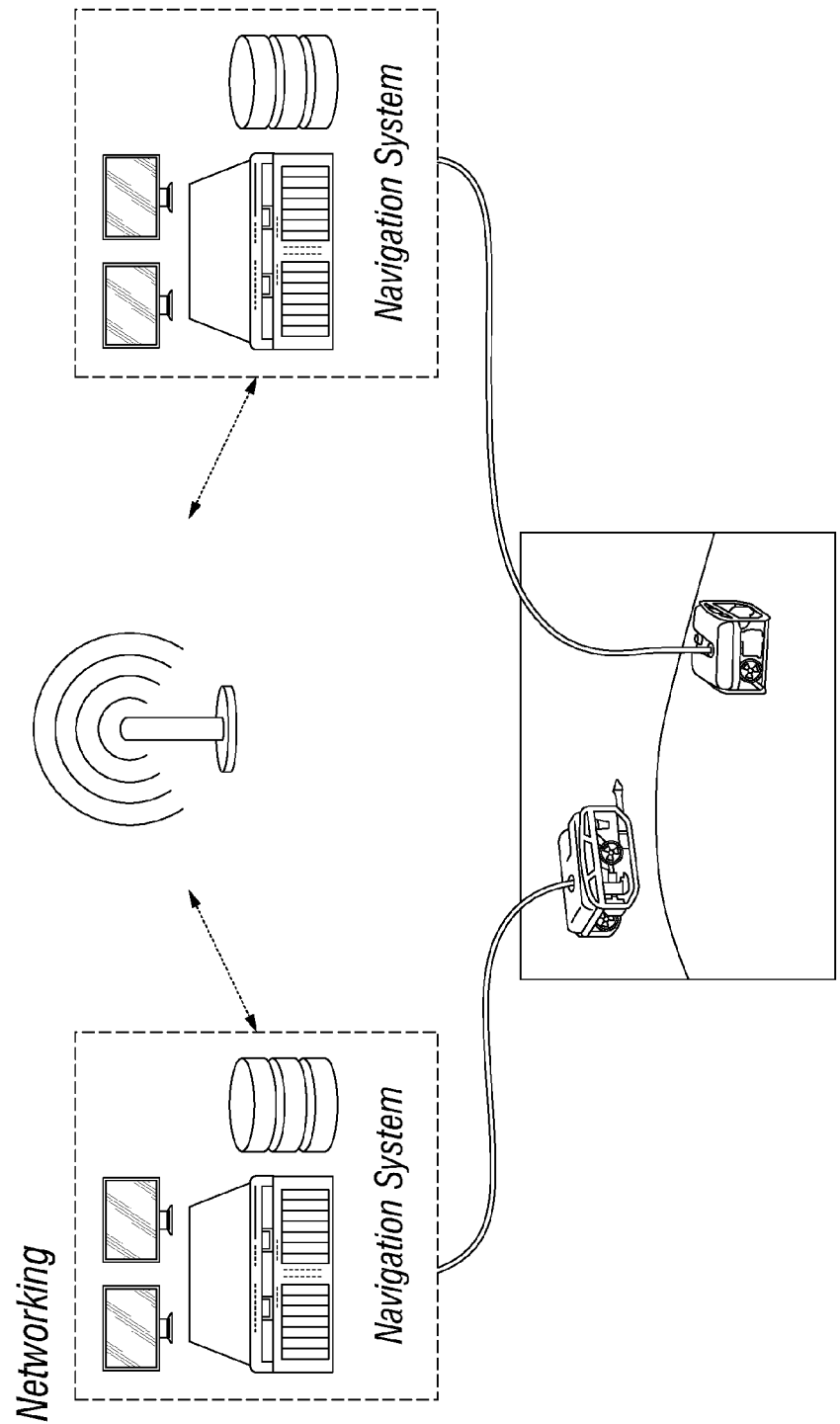
FIG. 3C is a diagrammatic illustration of networked systems, in an exemplary embodiment.

FIG. 3B depicts a further software architecture overview illustrating that the operating system 3, which mediates the aforementioned user functions, is networked to provide communication between a multi touch supervision console and a pilot or pilots. FIG. 3C illustrates yet another level of connectivity, wherein the navigation system of a first ROV may share all of its dynamic data with the navigation system of another ROV over a network.

Visualization Engine

Figure 4:
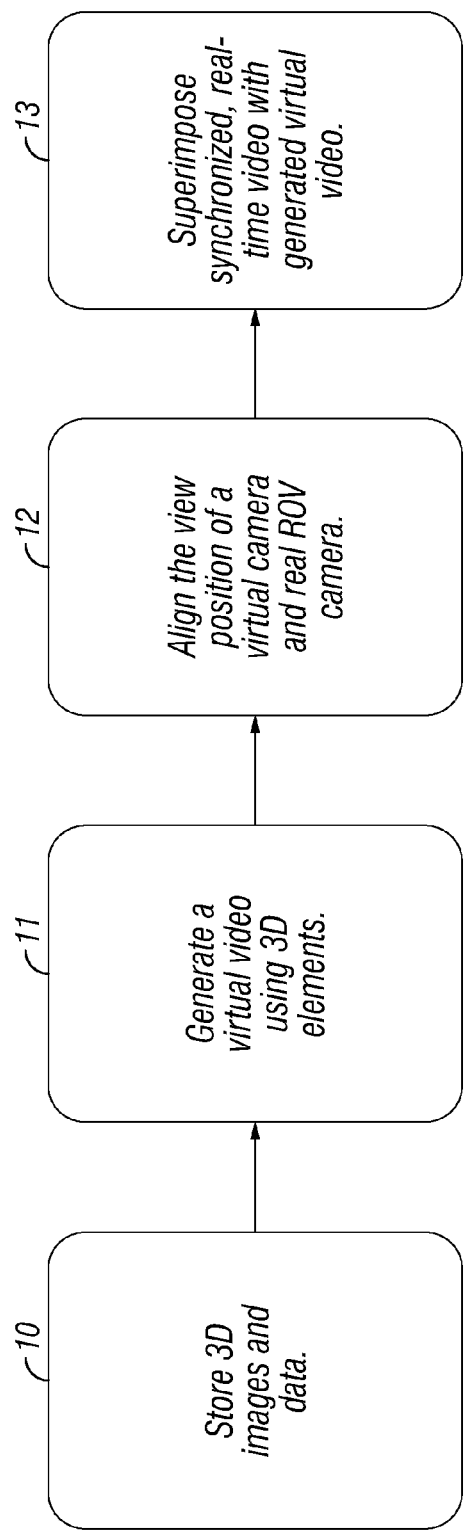
FIG. 4 depicts modules for achieving hybrid 3D imagery, and a method for their use, according to yet another embodiment of the invention.

As seen from FIGS. 1B and 3A, the operating system's 3 visualization engine further includes modules for implementing 3D imagery, two-dimensional ("2D") imagery, and providing a real-time environment update. These modules are shown in FIG. 4, which illustrates in a stepwise fashion how the system operates to create superimposed hybrid 3D imagery.

A 3D database module 10 includes advanced 3D rendering technology to allow all the stages of ROV operation to be executed with reference to a visually re-created 3D deepwater environment. This environment is composed by the seabed bathymetry and modeled equipment, e.g., structures of ocean energy devices.

As discussed above, the main sources of image data are pre-recorded 3D modeling of sonar data (i.e., computer-generated 3D video) and possibly other video data; live sonar data and video data obtained in real time; user-determined 3D elements; and textual or graphical communications intended to be displayed on the user interface screen. The geographical position and depth of any elements or regions included in the image data are known by GPS positioning, by use of acoustic and/or inertial positioning systems, and/or by reference to maps.

In a preferred embodiment of the invention, a virtual video generation module 11 is provided for using the aforementioned stored 3D elements or real-time detected 3D elements to create a virtual video of such 3D elements. The virtual video generation module 11 may work in concert with a synchronization module 12.

Figure 5A:
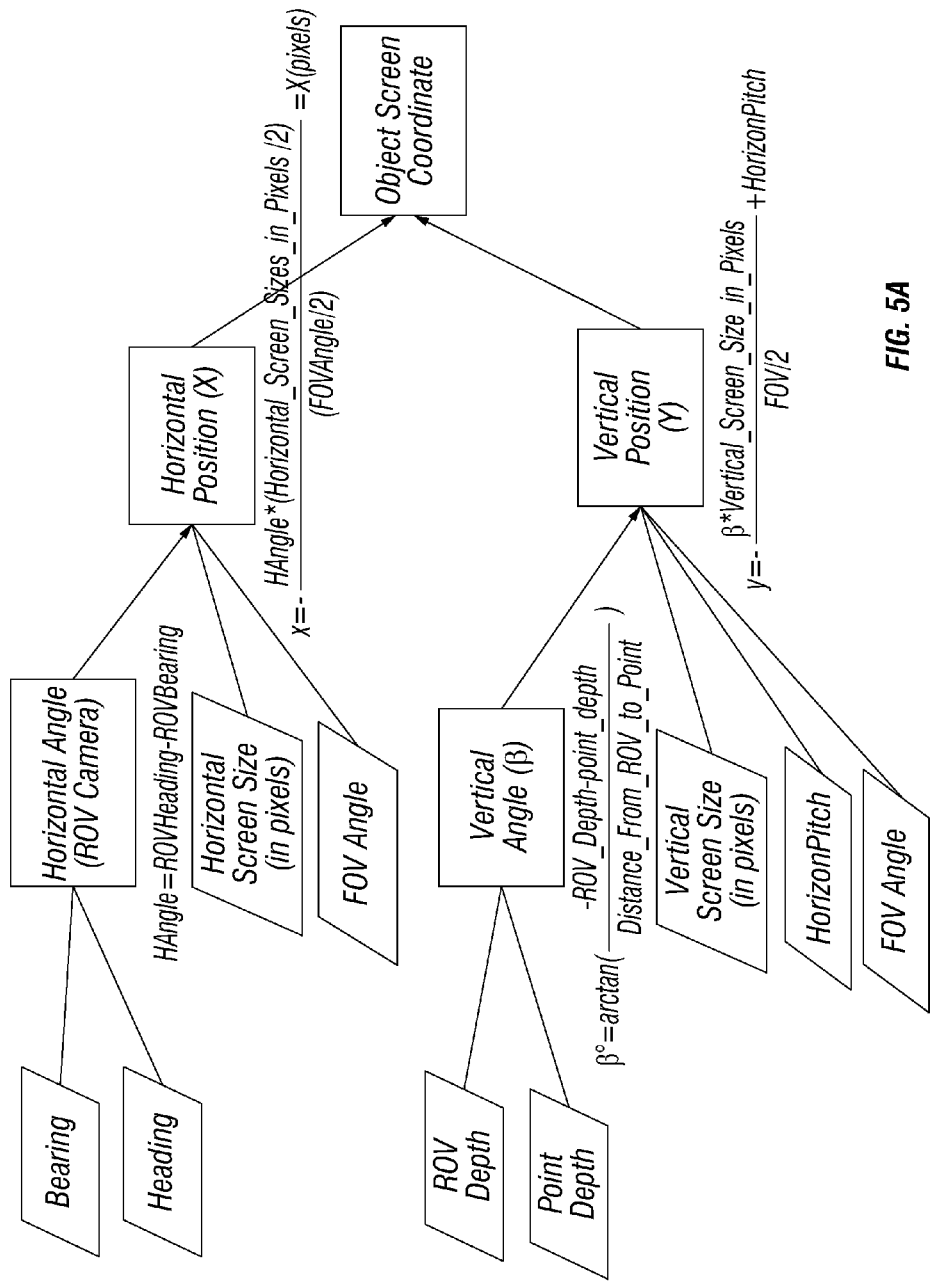
FIG. 5A illustrates calculations for aligning a virtual video and a real video, according to an exemplary embodiment.

The synchronization module 12 aligns the position of the virtual camera of the virtual video with the angle and position of a real camera on an ROV. According to one embodiment the virtual camera defines a field of view for the virtual video, which may preferably extend between 45 and 144 degrees from a central point of view. As illustrated in FIG. 5A, the alignment of virtual and real camera angles may be accomplished by calculating the angle between the heading of the ROV and the direction of the camera field of view; calculating the angle between the vertical of the ROV and the direction of the camera field of view; and calculating the angle between the ROV and the geographic horizon. These calculated angles are then used to determine an equivalent object screen coordinate of the digital X-Y axis at determined time intervals or anytime a variable changes value.

A superimposition module 13, whose function is additionally diagramed in FIG. 5B, is provided for superimposing the generated virtual video 20 and the synchronized, real-time video 21 acquired by the ROV's digital camera. The result is hybrid superimposed 3D imagery 22, wherein the system effectively draws the generated 3D environment on top of the non-visible part of the video feed, thus greatly enhancing visibility for the ROV pilot. More specifically, the superimposition software divides the camera-feed video and the generated 3D video into several layers on the z-buffer of the 3D rendering system. This permits the flattening of the layers and their superimposition, which simulates spatial perception and facilitates navigation.

Yet another feature of the superimposition module 13 is that either one or both of the virtual 20 or real videos 21 may be manipulated, based upon a luminance threshold, to be more transparent in areas of lesser interest, thus allowing the corresponding area of the other video feed to show through. According to one embodiment of the invention, luminance in the Red-Green-Blue hexadecimal format may be between 0-0-0 and 255-255-255, and preferably between 0-0-0 and 40-40-40. Areas of lesser interest may be selected by a system default, or by the user. The color intensity of images in areas of lesser interest is set at the luminance threshold, and the corresponding region of the other video is set at normal luminance. For the example shown in FIG. 5B, the background of the virtual video 20 is kept relatively more transparent than the foreground. Thus, when the real video 21 is superimposed on the virtual 3D image 20, the real video 21 is selectively augmented primarily with the virtual foreground, which contains a subsea structure of interest.

Navigation Engine

The on-screen, 2D Navigation Interface for the ROV pilot involves superimposing geopositioned data or technical information on a 2D rendering system. Geopositioning or geo-tagging of data and elements is executed by reference to maps or to global positioning satellites. The resulting Navigation Interface, as seen in FIGS. 6A-6D, is reminiscent of aviation-type heads up display consoles. In the case of subsea navigation, the display is configured to indicate ROV 1 position based on known coordinates, and by using a sonar system that records 3D images from a ROV's position for later navigation. In this way, the present invention provides immersive visualization of ROV's operation.

Figure 6A:
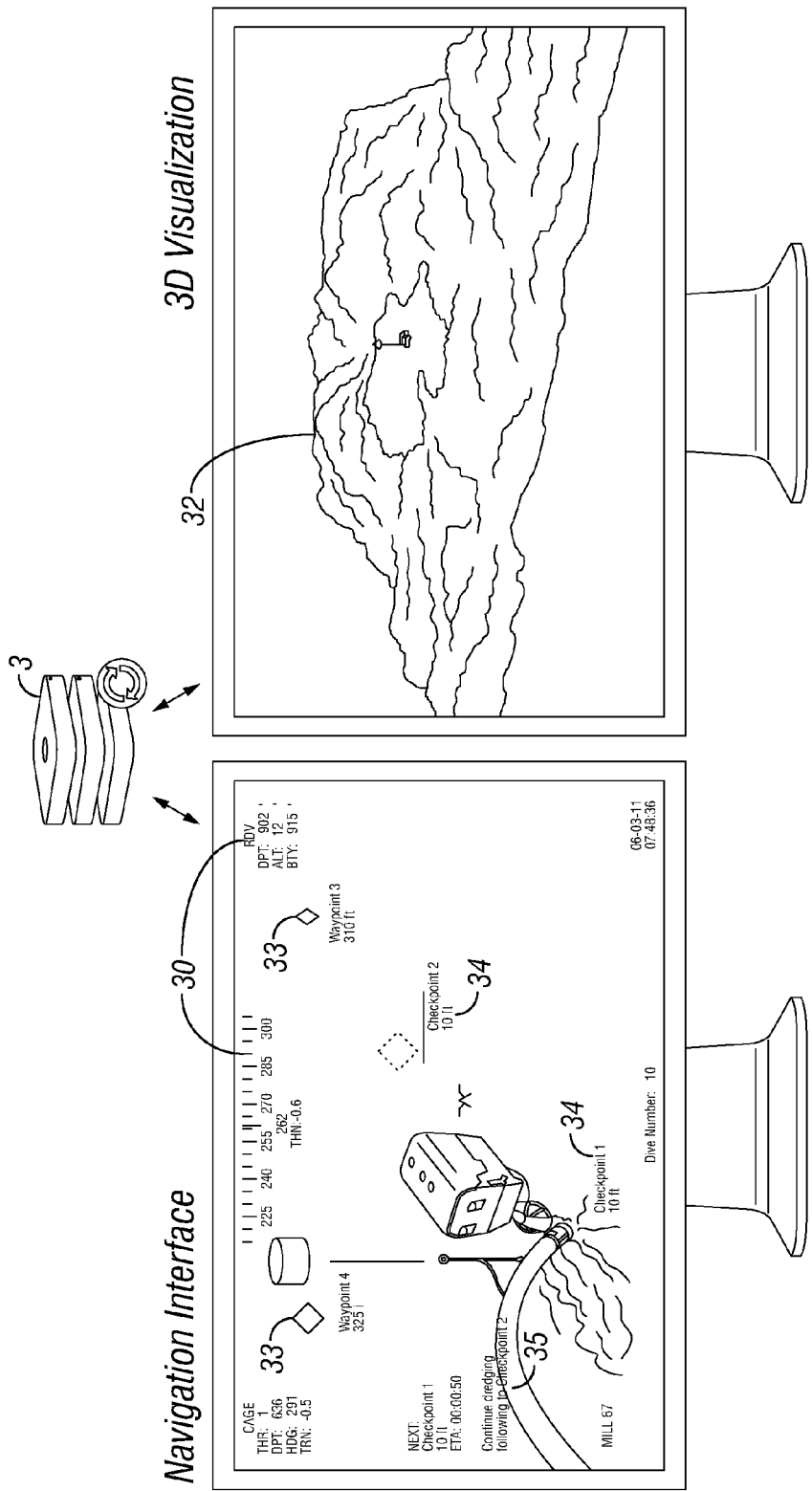
FIGS. 6A-6E depict several views of a navigation interface, according to exemplary embodiments.
Figure 6B:
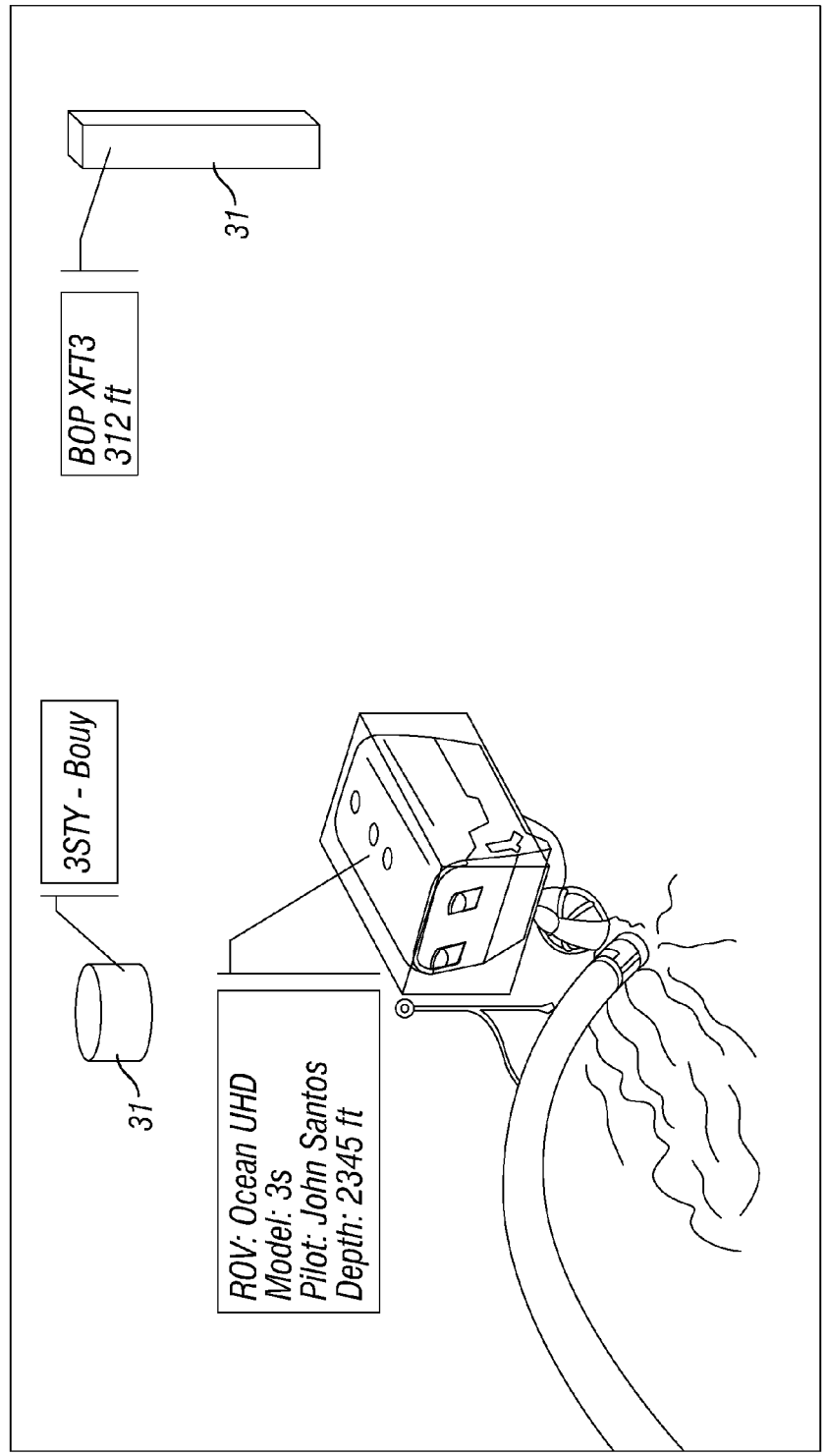

FIG. 6A illustrates the superposition of textual information and symbols 30 onto the 2D video rendering of the ROV user interface. FIG. 6B illustrates the superposition of 3D elements 31 onto the video rendering. The superposition of these data onto the video feed is useful, not only for navigating and controlling the ROV 1, but also for executing the related planning and supervising functions of the operating system 3. This superposition may be accomplished in a similar way to the superimposition of the video feeds, i.e., by obtaining screen coordinates of an object, and rendering text and numbers near those coordinates.

The planning module enables engineers and/or supervisors to plan one or several ROV missions. Referring again to FIG. 6A, an important feature of the planning module is the input and presentation of bathymetry information 32 through 3D visualization. As seen on the Navigation Interface, waypoints 33 and checkpoints 34 are superimposed onto the video feed. These elements may be identified, for example, by number, and/or by distance from a reference point. In other words, in addition to superimposing the technical specifications and status information 30 for the ROV 1 or other relevant structures, the Navigation Interface also provides GPS-determined positions for navigation and pilot information.

Figure 6C:
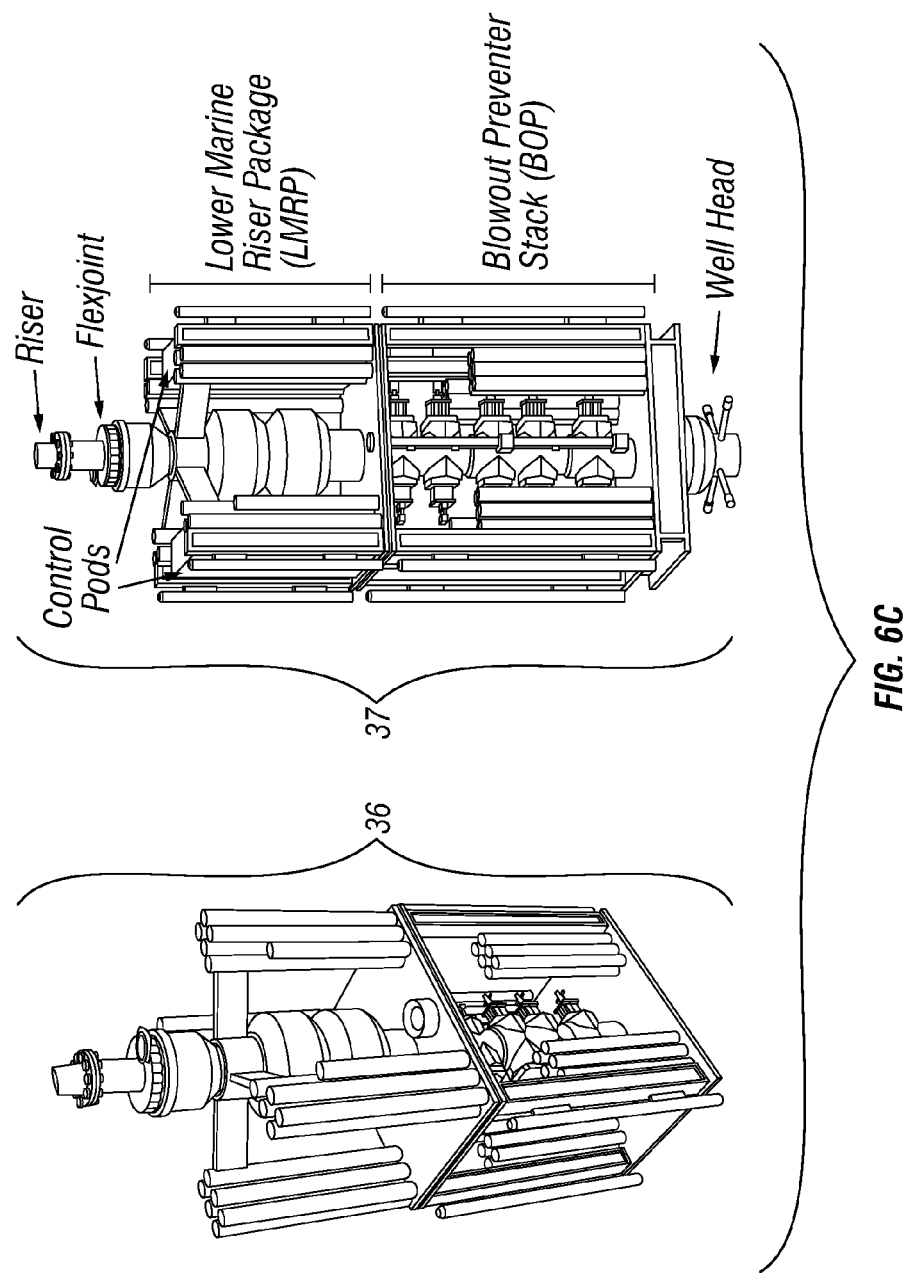

In another aspect of the invention, procedures 35, including timed procedures (fixed position observation tasks, for example), may be included on the Navigation Interface as text. Given this procedural information, a ROV pilot is enabled to anticipate and complete tasks more accurately. A user may also use the system to define actionable areas. Actionable areas are geopositioned areas in the undersea environment that trigger a system action when entering, leaving, or staying longer than a designated time. The triggered action could be an alarm, notification, procedure change, task change, etc. Referring to FIG. 6C, using a series of rules established in the planning module, or by manual input, the system may show more or less 2D geo-tagged information on the Navigation Interface. For example, as seen at 36, during a ROV operation when the pilot is at 100 meters from a geo-tagged object, the system may show only general information relating to the overall structure, or specific information needed for a specific current task in the nearby area. As the pilot approaches the geo-tagged structure, shown at 37, the system may incrementally show more information about components of that structure. This dynamic and manual level of detail control may apply to both textual and symbolic information 30, as well as to the augmentation of 3D elements 31.

Figure 6D:
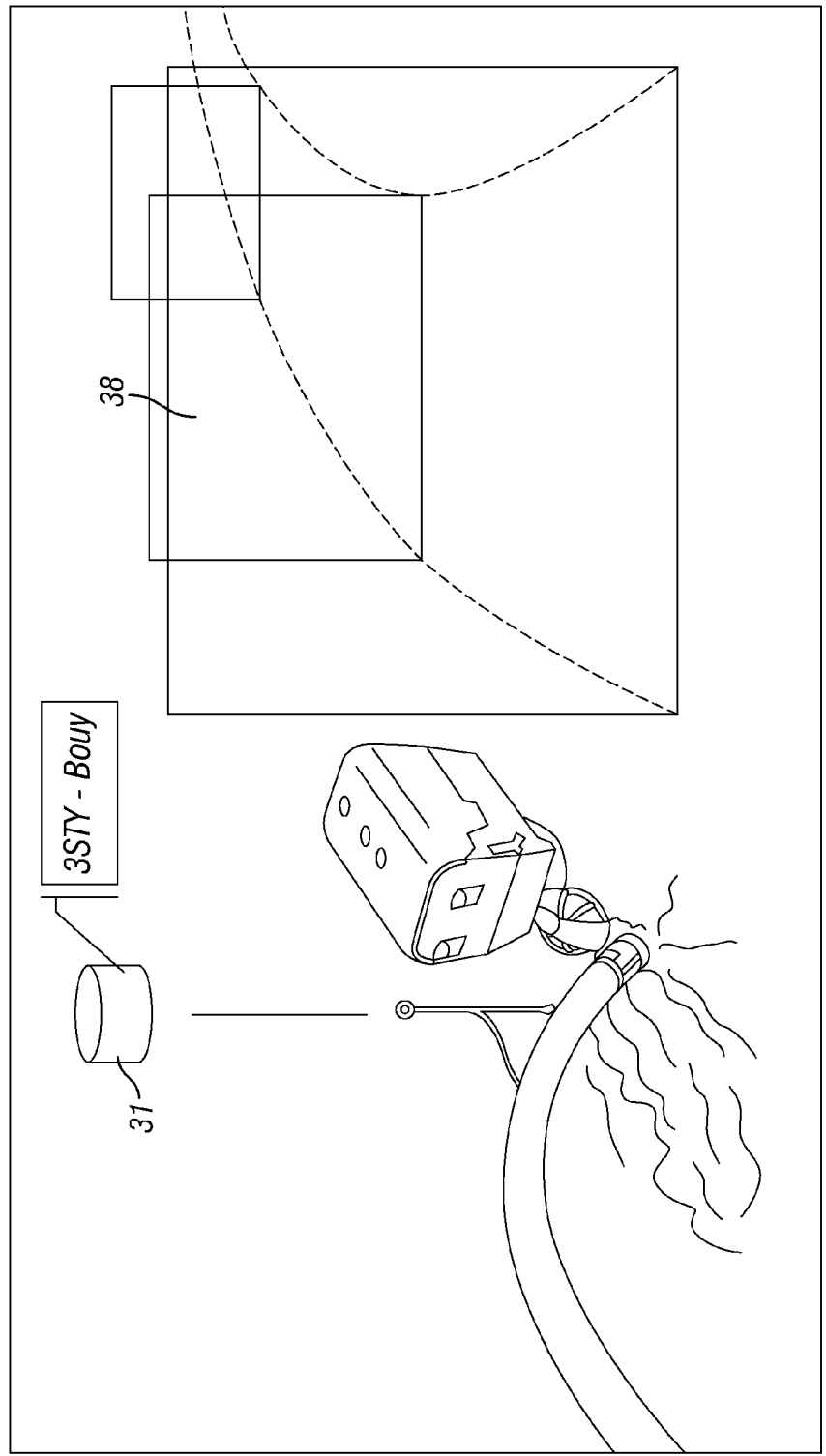
Figure 6E:
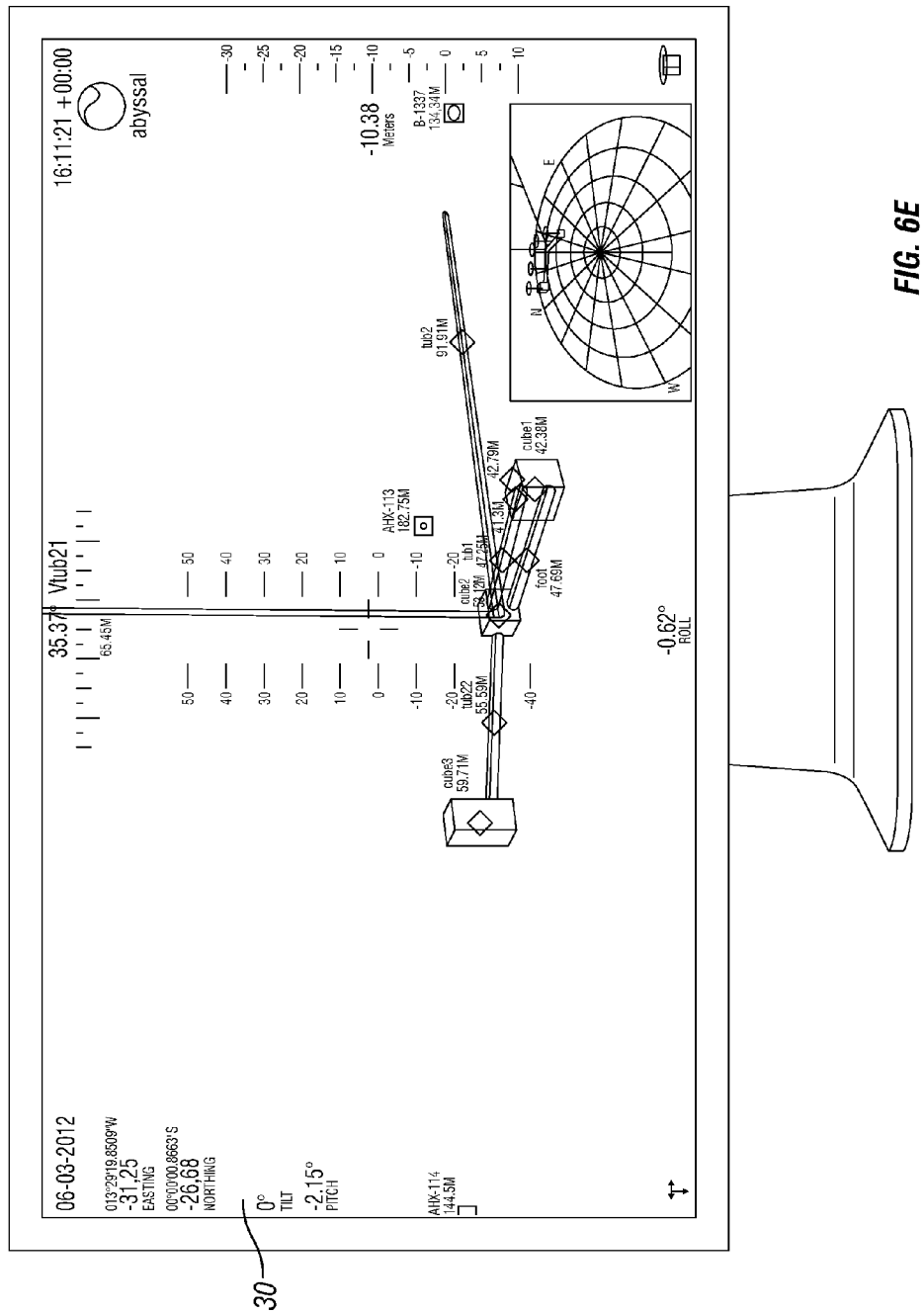

With reference to FIG. 6D, the planning module may also provide on-screen information relating to flight path 38. As seen in FIG. 6E, another important feature of the invention is embodied by a minimap 39, i.e., a graphic superimposed on the video, which may include a variety of different representations, such as small icons representing target objects. The minimap 39 may show the cardinal points (North, South, East, West) in a 3D representation, optionally in addition to a representation of a relevant object in tridimensional space. The minimap 39 may be positioned in a corner, and may be moved, dismissed and recalled by the user.

Data Engine

The data engine, which mediates the data warehousing and data transfer functions of the invention, therefore incorporates the logging and supervising modules.

The logging module logs or records all information made available by the operating system and saves such data in a central database for future access. The available information may include any or all telemetry, sonar data, 3D models, bathymetry, waypoints, checkpoints, alarms or malfunctions, procedures, operations, and navigation records such as flight path information, positioning and inertial data, etc.

An essential part of any offshore operation providing critical data to the client after the operation is concluded. After the operation, during the debriefing and reporting stage, the debriefing and reporting module may provide a full 3D scenario or reproduction of the operation. The debriefing and reporting module may provide a report on the planned flight path versus the actual flight path, waypoints, checkpoints, several deviations on the plan, alarms given by the ROV, including details of alarm type, time and location, procedures, checkpoints, etc. ready to be delivered to the client. Accordingly, the operating system is configured to provide four-dimensional (three spatial dimensions plus time) interactive reports for every operation. This enables fast analysis and a comprehensive understanding of operations.

Yet another software element that interacts with of the Navigation Interface is the supervisor module. Execution of the supervisor module enables one or more supervisors to view and/or utilize the Navigation Interface, and by extension, any ROV 1 being controlled from the interface. These supervisors need not share the location of the ROV pilot or pilots, but rather may employ the connectivity elements depicted in FIGS. 3B and 3C. A plurality of multi touch supervision consoles may be used at different locations. For example, one could have nine monitors connected to three exemplary hardware structures, including an ROV 1, where only one operating system 3 gathered the ROV data and shared information with the others. Alternatively, between one and 12 networked monitors may be used, and preferably between 3 and 9 may be used.

Networking provided as shown in FIGS. 3B and 3C may reduce risks, such as human error, in multiple-ROV operations, even those coordinated from separate vessels. Networking through the supervisor module allows for the sharing of information between ROV systems, personnel and operations across the entire operation workflow.

Thus, there has been shown and described a system and method relating to navigation and control of ROVs. The method and system are not limited to any particular hardware or software configuration. The many variations, modifications and alternative applications of the invention that would be apparent to those skilled in the art, and that do not depart from the scope of the invention are deemed to be covered by the invention.

What is claimed is:

1. A system for exploration comprising:
   a remote operated vehicle (ROV), wherein said ROV comprises a video camera for acquiring a live video feed;
   a networked operating system comprising a visualization engine, wherein said visualization engine further comprises:
      a database module of 3D elements representing objects disposed in an operation environment of said remote operated vehicle;
      a virtual video generating module for generating a virtual video feed incorporating said 3D elements;
      a synchronizing module for synchronizing an angle and position of a virtual camera with an angle and position of the video camera, wherein the virtual camera defines a field of view for the virtual video feed, wherein the field of view is preferably between about 45 and 144 degrees from a central point of view; and
      a superimposition module for superimposing said virtual video feed and said live video feed, wherein said superimposition module is configured to modulate the transparency or opaqueness of a region of lesser interest in one of the virtual or live video feeds such that a corresponding region of the other video feed is more visible, said superimposed virtual and live video feeds comprising hybrid 3D imagery; and
   a navigation interface configured to display said hybrid 3D imagery, said navigating interface comprising at least one networked monitor.

2. The system according to claim 1, wherein the superimposition module is configured to superimpose graphic information, textual information, or both, onto the hybrid 3D imagery.

3. The system according to claim 1, wherein said superimposing is based on a luminance threshold in Red-Green-Blue hexadecimal format, wherein luminance is set to values between 0-0-0 and 255-255-255, and preferably between 0-0-0 and 40-40-40.

4. The system according to claim 1, wherein the operating system is capable of sharing data with a plurality of remote monitors, said plurality comprising up to 12 remote monitors, and preferably between 3 and 9 remote monitors.

5. The system according to claim 1, further comprising an external system configured to determine whether the system is working or is in a fail state.

6. The system according to claim 5, wherein the external system is configured to switch the monitor input from hybrid 3D imagery to said live video feed if the system is in a fail state.

7. The system according to claim 1, wherein the navigation interface comprises at least three networked monitors, wherein said monitors are arranged adjacent to one another such that the middle monitor displays superimposed virtual and live video feeds, while both side monitors display an expanded view of a field of operation.

8. The system according to claim 1, wherein the 3D elements are obtained from any of pre-recorded sonar data, live sonar data, programmed 3D objects, user-determined inputs, and bathymetry.

9. A method for exploration, comprising:
   storing 3D elements in a database module, said 3D elements representing objects disposed in the remotely operated vehicle's operation environment;
   generating a virtual video feed of said 3D elements;
   obtaining a live video feed using a video camera;
   synchronizing an angle and position of a virtual camera with an angle and position of the video camera mounted to the remotely operated vehicle, wherein the virtual camera defines a field of view for the virtual video feed; and
   superimposing said virtual video feed and said live video feed on a video screen, wherein superimposing further comprises the step of modulating the transparency or opaqueness of a region of lesser interest in one of the virtual or live video feeds such that a corresponding region of the other video feed is more visible, said superimposed virtual and live video feeds comprising hybrid 3D imagery.

10. The method according to claim 9, further comprising superimposing graphic information, textual information, or both, onto the hybrid 3D imagery.

11. The method according to claim 9, wherein the step of modulating the transparency or opaqueness further comprises establishing a luminance threshold.

12. The method according to claim 11, wherein establishing the luminance threshold comprises maintaining a background of the virtual video feed at a higher transparency than the background of the real video feed.

13. The method according to claim 9, wherein synchronizing the angle and position of the video camera comprises the steps of:
   calculating an angle between a heading of the vehicle and a direction of a field of view of the video camera;
   calculating an angle between a vertical orientation of the vehicle and the direction of the video camera field of view; and
   calculating an angle between the vehicle and a geographic horizon.

14. The method according to claim 9, wherein the step of superimposing further comprises modulating the amount of 2D or 3D information superimposed onto the video screen based on the position of the ROV relative to objects disposed in the remotely operated vehicle's operation environment.

15. The method according to claim 9, wherein the step of superimposing further comprises providing a minimap, said minimap defining a computer-generated graphic showing either or both cardinal points or a position of an object in 3D.

16. The method according to claim 9, comprising the step of configuring the operating system such that entering, leaving, or remaining longer than a designated time at a GPS-determined position triggers any one or combination of an alarm, notification, procedure change or task change.

17. The method according to claim 9, wherein the 3D elements are obtained from any of pre-recorded sonar data, live sonar data, programmed 3D objects, user-determined inputs, and bathymetry.

18. A computer-readable medium including code for exploration, the code when executed operable to:
 store 3D elements in a database module, said 3D elements representing objects disposed in the remotely operated vehicle's operation environment;
 generate a virtual video feed of said 3D elements;
 obtain a live video feed using a video camera;
 synchronize an angle and position of a virtual camera with an angle and position of the video camera mounted to the remotely operated vehicle, wherein the virtual camera defines a field of view for the virtual video feed; and
 superimpose said virtual video feed and said live video feed on a video screen, wherein superimposing further comprises the step of modulating the transparency or opaqueness of a region of lesser interest in one of the virtual or live video feeds such that a corresponding region of the other video feed is more visible, said superimposed virtual and live video feeds comprising hybrid 3D imagery.

19. The computer readable medium according to claim 18, wherein the code for synchronizing the angle and position of the video camera is further operable to:
 calculate an angle between a heading of the vehicle and a direction of a field of view of the video camera;
 calculate an angle between a vertical orientation of the vehicle and the direction of the video camera field of view; and
 calculate an angle between the vehicle and a geographic horizon.

20. The computer readable medium according to claim 18, wherein the 3D elements are obtained from any of pre-recorded sonar data, live sonar data, programmed 3D objects, user-determined inputs, and bathymetry.

* * * * *